(12) United States Patent
Wang et al.

(10) Patent No.: US 11,387,769 B2
(45) Date of Patent: Jul. 12, 2022

(54) POWER TOOL

(71) Applicant: Nanjing Chervon Industry Co., Ltd., Nanjing (CN)

(72) Inventors: Hongwei Wang, Nanjing (CN); Qian Xu, Nanjing (CN); Weipeng Chen, Nanjing (CN); Xiangqing Fu, Nanjing (CN); Dongrong Qiu, Nanjing (CN); Wencheng Li, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 4 days.

(21) Appl. No.: 16/433,817

(22) Filed: Jun. 6, 2019

(65) Prior Publication Data

US 2019/0288632 A1    Sep. 19, 2019

Related U.S. Application Data

(63) Continuation of application No. PCT/CN2017/115810, filed on Dec. 13, 2017.

(30) Foreign Application Priority Data

Dec. 14, 2016  (CN) .......................... 201611152803.4
Oct. 19, 2017  (CN) .......................... 201710975196.X

(51) Int. Cl.
*H02P 6/08* (2016.01)
*H02P 29/40* (2016.01)
(Continued)

(52) U.S. Cl.
CPC ............ *H02P 29/40* (2016.02); *B24B 23/028* (2013.01); *H02P 29/50* (2016.02); *H02P 6/14* (2013.01); *Y02P 70/10* (2015.11)

(58) Field of Classification Search
CPC .......... H02P 29/40; H02P 29/50; H02P 6/085; H02P 6/14; B24B 23/028; H02K 7/145;
(Continued)

(56) References Cited

U.S. PATENT DOCUMENTS 5,345,375 A * 9/1994 Mohan ...................... H02J 3/01
                                                          307/105
9,793,847 B2  10/2017 Iwata et al.
(Continued)

FOREIGN PATENT DOCUMENTS

CN     201669691 U    12/2010
CN     103248314 A     8/2013
(Continued)

OTHER PUBLICATIONS

ISA/CN, Int. Search Report issued on PCT application No. CN2017/115810, dated Mar. 15, 2018, 2 pages.

*Primary Examiner* — Muhammad S Islam
*Assistant Examiner* — Zemenay T Truneh
(74) *Attorney, Agent, or Firm* — Greenberg Traurig, LLP

(57) ABSTRACT

A power tool includes a brushless motor including several windings, a drive circuit for driving the brushless motor, a detection device for detecting the brushless motor so as to obtain a load parameter corresponding to a load of the brushless motor, and a controller for outputting a first control signal to reduce current of the brushless motor in a first slope when the load parameter exceeds a first preset range.

20 Claims, 9 Drawing Sheets

(51) Int. Cl.
*H02P 29/50* (2016.01)
*B24B 23/02* (2006.01)
*H02P 6/14* (2016.01)

(58) Field of Classification Search
CPC ........ H02M 1/14; H02M 1/44; H02M 7/5387; Y02P 70/10; Y02P 70/177
USPC .................. 318/17, 400.22, 400.27; 361/118
See application file for complete search history.

(56) References Cited

U.S. PATENT DOCUMENTS

| | | | |
|---|---|---|---|
| 2006/0158814 A1* | 7/2006 | Wasaki | H03H 7/09 361/118 |
| 2007/0145919 A1 | 6/2007 | Hamaoka et al. | |
| 2014/0028237 A1 | 1/2014 | Park et al. | |
| 2015/0256111 A1* | 9/2015 | Forster | H02P 6/14 318/400.27 |
| 2016/0164448 A1* | 6/2016 | Kane | H02M 1/44 318/400.24 |

FOREIGN PATENT DOCUMENTS

| | | |
|---|---|---|
| CN | 103348581 A | 10/2013 |
| CN | 203352517 U | 12/2013 |
| CN | 205219043 U | 5/2016 |
| EP | 2093872 A1 | 8/2009 |
| EP | 2873493 A2 | 5/2015 |
| JP | 2007318984 A | 12/2007 |

\* cited by examiner

POWER TOOL

RELATED APPLICATION INFORMATION

The present application is a continuation of International Application Number PCT/CN2017/115810, filed on Dec. 13, 2017, which application claims the benefit of Chinese Patent Application No. 201611152803.4, filed on Dec. 14, 2016, and Chinese Patent Application No. 201710975196.X, filed on Oct. 19, 2017, the disclosures of which are incorporated herein by reference in their entirety.

FIELD OF THE DISCLOSURE

The present disclosure relates generally to power tools and, more particularly, to a power tool which can be connected with DC power or AC power.

BACKGROUND OF THE DISCLOSURE

Currently known power tools include two types. One type is powered by an AC power supply and the other type is powered by a DC power supply. Because the DC power supply can only provide limited power, some power tools with high power requirements are usually connected with commercial AC power.

Due to the fluctuation of the commercial power, it is needed to design a power tool powered by an AC power supply with a stable output property.

The statements in this section merely provide background information related to the present disclosure and may not constitute prior art.

SUMMARY

In one aspect of the disclosure, a power tool is provided. The power tool includes a brushless motor including several windings, a drive circuit for driving the brushless motor, a detection device for detecting the brushless motor so as to obtain a load parameter corresponding to a load of the brushless motor, and a controller for outputting a first control signal to reduce current of the brushless motor in a first slope when the load parameter exceeds a first preset range.

In another aspect of the disclosure, a control method of a power tool is provided. The power tool includes a brushless motor including several windings, a drive circuit for driving the brushless motor, a detection device for detecting the brushless motor so as to obtain a load parameter corresponding to a load of the brushless motor. The control method includes outputting a first control signal to reduce current of the brushless motor in a first slope when the load parameter exceeds a first preset range.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected examples and not all possible implementations, and are not intended to limit the scope of the present disclosure. Corresponding reference numerals indicate corresponding parts throughout the several views of the drawings.

DETAILED DESCRIPTION

The following description of the preferred examples is merely exemplary in nature and is in no way intended to limit the invention, its application, or uses.

Figure 1:
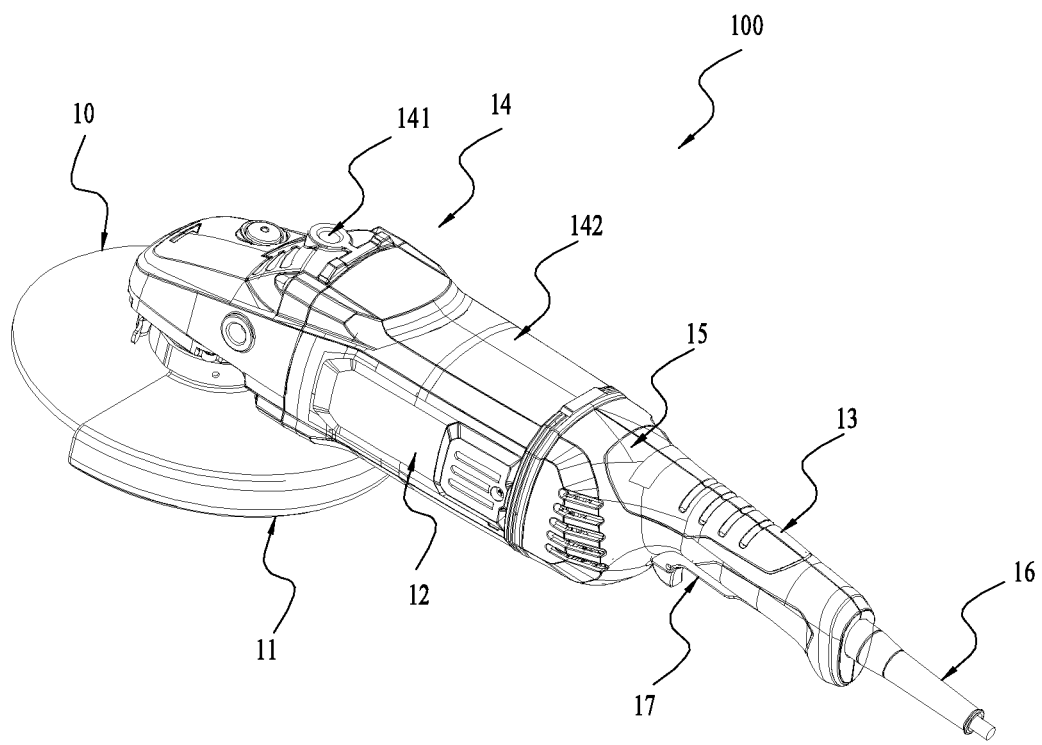
FIG. 1 is a schematic view of an example angle grinder.
Figure 2:
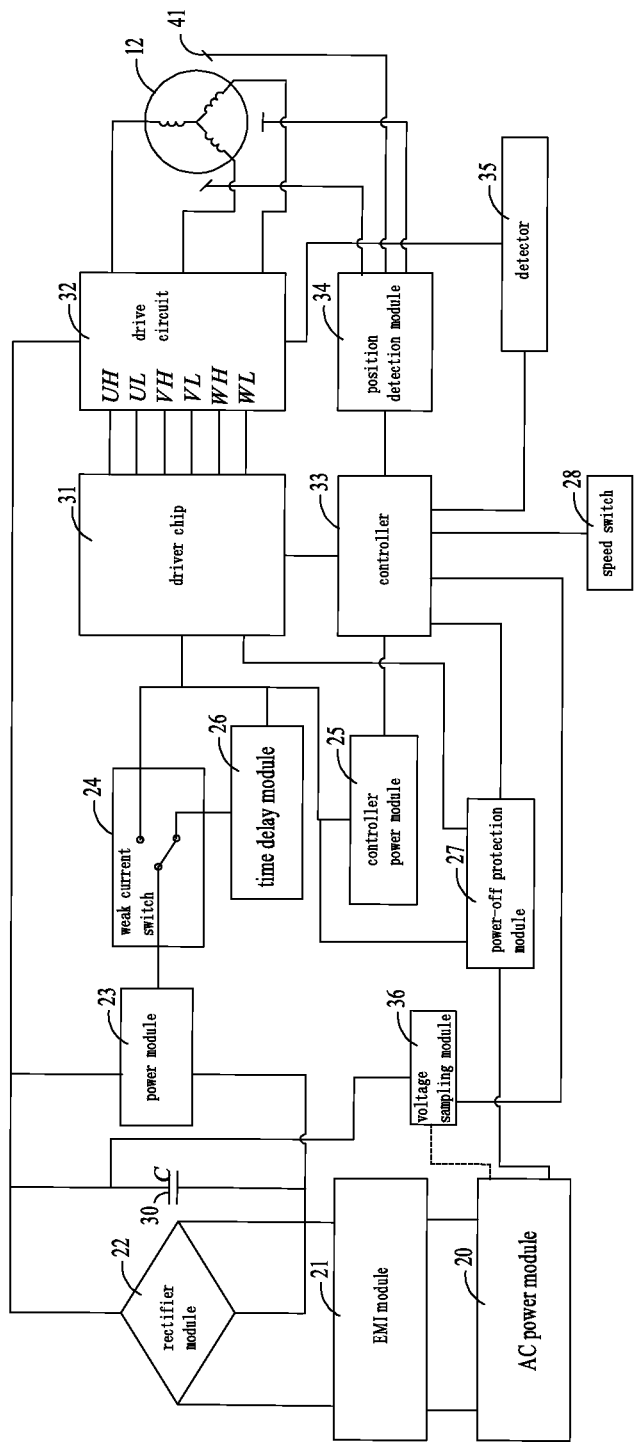
FIG. 2 is a circuit block diagram of the angle grinder in FIG. 1.

Referring to FIGS. 1-2, an angle grinder 100 includes a grinding disc 10, a guard 11, an output shaft, a motor 12, a handle 13, a transmission mechanism, a housing 14 and a braking device 15.

The grinding disc 10 is used to realize the function of grinding or cutting. The guard 11 at least partially covers the grinding disc 10 so as to realize the function of a guard. The output shaft is used to mount or fix the grinding disc 10. The motor 12 is used to drive the output shaft to rotate. Specifically, the motor includes a motor shaft, and the motor shaft and the output shaft are connected through the transmission mechanism so that the driving power of the motor shaft is transmitted to the output shaft. The housing 14 is used to mount or fix the motor 12. The handle 13 is used for a user to grip, which can be an independent part or formed by the housing 14. The housing 14 includes a head housing 141 and a body housing 142. The motor 12 is fixed to the body housing 142. The head housing 141 is used to mount the transmission mechanism. A power cord 16 can be connected with an AC power supply. The angle grinder 100 further includes an operating switch 17 for turning on or off the motor 12. When the operating switch 17 is triggered, the motor 12 is turned on, and when the operating switch 17 is released, the motor 12 is turned off. The operating switch 17 is disposed on the handle 13. The braking device 15 is disposed between the handle 13 and the motor 12, which is able to brake the motor shaft quickly. When it is needed to stop the grinding disc 10 from rotating, the braking device 15 can stop the motor 12 within a short time.

As shown in FIG. 2, a structure block diagram of a motor drive system 200 is shown. The motor drive system 200 includes an AC power module 20, an EMI module 21, a rectifier module 22, an electrolytic capacitor 30, a power module 23, a driver chip 31, a drive circuit 32, a controller 33 and a position detection module 34.

The AC power module 20 can be connected with the AC power supply to supply alternating current to the motor 12. Specifically, the AC power module 20 includes an AC plug for connecting with a 120V or 220V AC power supply. The range of AC voltage is 85V~265V. As one example, the voltage of the connected alternating current is in the range of 110 V to 130 V. As another example, the voltage of the connected alternating current is in the range of 210V to 230V. The motor 12 is a brushless motor, and more specifically, the motor 12 is a three-phase brushless DC motor.

The rectifier module 22 is used to convert alternating current inputted by the AC power module 20 to pulsating direct current and to output the pulsating direct current. Specifically, the rectifier module 22 includes a rectifier bridge constituted by four diodes, and the alternating current can be converted to the pulsating direct current in the same direction by making use of the unilateral conductivity and voltage drop of the diodes.

Figure 9:
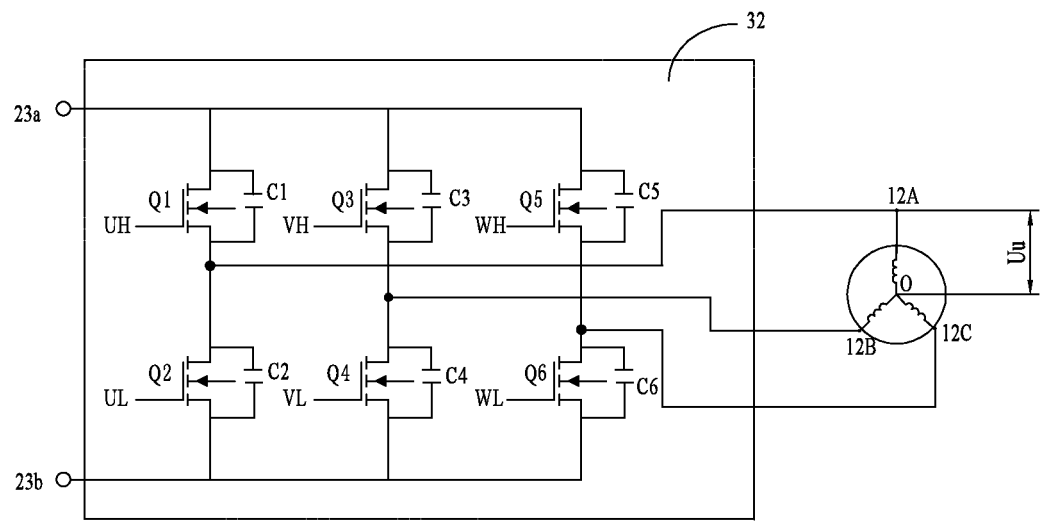
FIG. 9 is a circuit diagram of another drive circuit.
Figure 10:
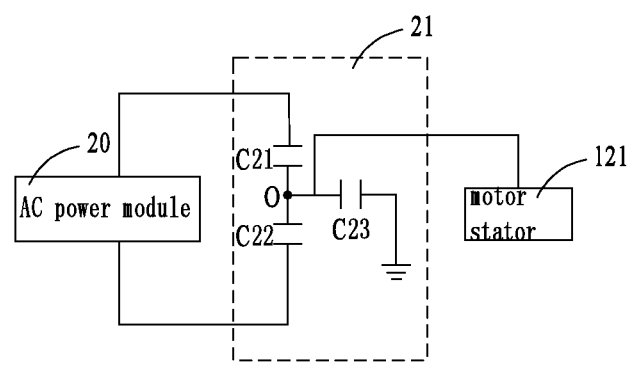
FIG. 10 is a circuit block diagram of the EMI module in FIG. 2.

The EMI module 21 is connected in series between the AC power module 20 and the rectifier module 22 for reducing the influence of electromagnetic interference on the circuit. As shown in FIG. 9, the EMI module 21 includes a first capacitor C21, a second capacitor C22 and a third capacitor C23. One end of the first capacitor C21 is connected with the high-voltage terminal of the AC power module 20, and the other end of the first capacitor C21 is connected with one end of the second capacitor C22. The other end of the second capacitor C22 is connected with the low-voltage terminal of the AC power module 20. One end of the third capacitor C23 is connected with the connection of the first capacitor C21 and the second capacitor C22, and the other end of the third capacitor C23 is grounded. That is, the first capacitor C21, the second capacitor C22 and the third capacitor C23 constitute a Y-type connection. The motor 12 has a stator housing which is connected with one end of the third capacitor C23 electrically, so that the stator housing is grounded through the third capacitor C23 and the influence of electromagnetic interference on the motor 12 is reduced.

Figure 11:
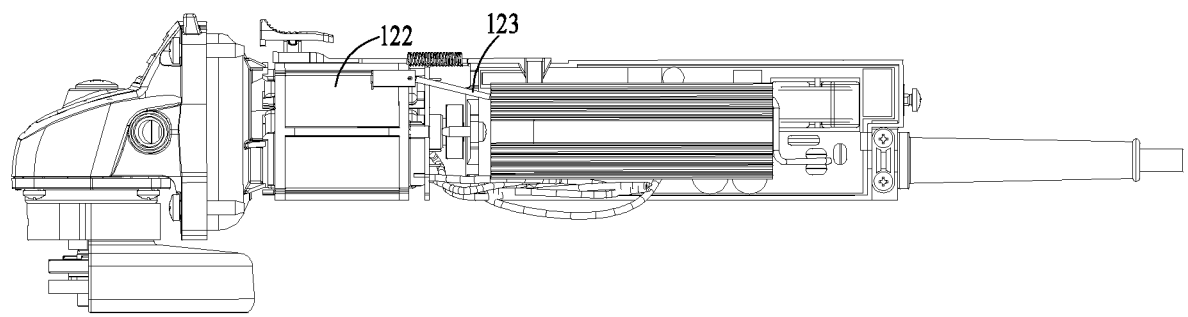
FIG. 11 is a cross-sectional view of the angular grinder shown in FIG. 1.

The stator metal region designator herein removes the metal-containing region of the stator winding. For example, a stator core 122 (shown in FIG. 11) is formed by superimposing a plurality of silicon steel sheets, or other components formed of a metal material, and the like.

Thus, the electromagnetic interference generated on the circuit board of the power tool is led to the stator of the motor through the third capacitor, thus reducing the electromagnetic interference. Compared with other schemes such as adopting special materials to absorb the EMI interference, the method has the advantages of low cost, simple and reliable scheme while meeting the EMI safety standard.

The electrolytic capacitor 30 is connected with the rectifier module 22 electrically. The pulsating direct current output by the rectifier module 22 is filtered and converted to smooth, direct current through the electrolytic capacitor 30 so as to reduce the interference of harmonics in the pulsating direct current. Specifically, a ratio between the capacitance of the electrolytic capacitor 30 and the rated power of the motor 12 is 20~80 uF/KW. This arrangement can save space and ensure that there is no capacitor with large physical dimension in the hardware circuit.

As one example, the EMI module 21, the rectifier module 22, and the electrolytic capacitor 30 are located on the circuit board, and the ratio of the projection area of the electrolytic capacitor on the maximum plane of the circuit board to the total area of the maximum plane of the circuit board is in the range of 1/50 to 1/15.

In order to ensure the smooth output of the motor 12, a ratio between a difference of the maximum voltage of the alternating current of the AC power module 20 and the rated power of the motor 12 and the maximum voltage of the alternating current is −25%~+25%. Specifically, the ratio of the difference between the maximum voltage of the alternating current connected to the AC power supply module 20 and the rated voltage of the motor 12 to the maximum voltage of the alternating current is in the range of −15%~+15%. This optimizes the power match between the motor and the AC power and improves the working performance of the power tool where the rated voltage is the maximum back EMF voltage of the motor at its rated speed.

The power module 23 is connected with the electrolytic capacitor 30 electrically for supplying power to all the modules of the motor drive system 200. Specifically, the power module 23 reduces the voltage of the smooth, direct current with high voltage filtered by the electrolytic capacitor 30 and then outputs the same.

As another example, a tantalum capacitor may be used instead of an electrolytic capacitor. As another example, the capacitor may also be a film capacitor or a polypropylene capacitor.

As shown in FIG. 2, the angle grinder 100 further includes a weak current switch 24 for turning on or off the electrical connection of the power module 23 and a controller power module 25. The controller power module 25 is used to supply power to the controller 33. The weak current switch 24 is connected with the power module 23 electrically, and the controller power module 25 is connected with the weak current switch 24 electrically.

When the weak current switch 24 turns on the connection of the power module 23 and the controller power module 25, the power module 23 supplies a high voltage power to the controller power module 25, and the controller power module 25 can supply a low voltage power to the controller 33.

When the connection of the power module 23 and the controller power module 25 is not turned on, the power module 23 cannot supply power to the controller power module 25. And when the connection of the power module 23 and the controller power module 25 is turned on, the controller 33 obtains power from the controller power module 25 and controls the drive circuit 32 to make the current output by the power module 23 pass through windings of the motor 12.

The angle grinder 100 further includes a time delay module 26 allowing the controller power module 25 to supply power to the controller 33 for a period of time after the weak current switch 24 is turned off. The time delay module 26 is connected electrically with the weak current switch 24 and the controller power module 25 respectively. Specifically, the time delay module 26 includes a capacitor.

A power-off protection module 27 is connected electrically with the AC power module 20, the controller 33 and the driver chip 31 respectively. The power-off protection module 27 is used to provide protection when the circuit and the motor 12 of the angle grinder 100 experience overload, short circuit or undervoltage, that is turning off the electrical connection of the AC power module 20 and the controller 33. Specifically, the power-off protection module 27 is a circuit breaker, an air switch or other electronic elements which can realize the function of power off.

As shown in FIG. 2, the weak current switch 24 has an ON state and OFF state, which can be set as the operating switch 17 of the angle grinder 100 for the user to operate. When the weak current switch 24 is turned on by the user, the power module 23 outputs and supplies power to the driver chip 31 and the controller power module 25. When the weak current switch 24 is turned off, the time delay module 26 makes the controller power module 25 still supply power to the controller 33 for a period of time.

The driver chip 31 is connected between the power module 23 and the drive circuit 32 for converting the direct voltage output by the power module 23 to a supply voltage adapted to the drive circuit 32 so as to supply power to the drive circuit 32. The driver chip 31 is connected in series between the power module 23 and the driver chip 31 for converting the direct voltage output by the power module 23 to a supply voltage adaptive to the driver chip 31 so as to supply power to the driver chip 31. Obviously, the driver chip 31 and the driver circuit 32 can be integrated on a single chip.

The position detection module 34 is connected with the motor 12 electrically for detecting the position of rotor of the motor 12. When the rotor rotates into a preset range which can be sensed by the position detection module 34, the position detection module 34 is in a signal state. When the rotor rotates out of the preset range, the position detection module 34 is switched to another signal state.

As shown in FIG. 2, three Hall sensors 41 are arranged in a circumferential direction of the rotor of the motor 12. The Hall sensors 41 detect the position of the rotor and send the position information to the position detection module 34. The position detection module 34 processes the position information of the rotor logically and converts the position information to information which can be used to communicate with the controller 33, and then sends the information to the controller 33. When the rotor rotates into or out of the preset range, the signal of the Hall sensors 41 changes, and the output signal of the position detection module 34 changes correspondingly.

When the rotor rotates into the preset range, the output signal of the Hall sensors 41 is defined as 1. And when the rotor rotates out of the preset range, the output signal of the Hall sensors 41 is defined as 0. A physical angle between the three Hall sensors 41 is 120°.

Figure 3:
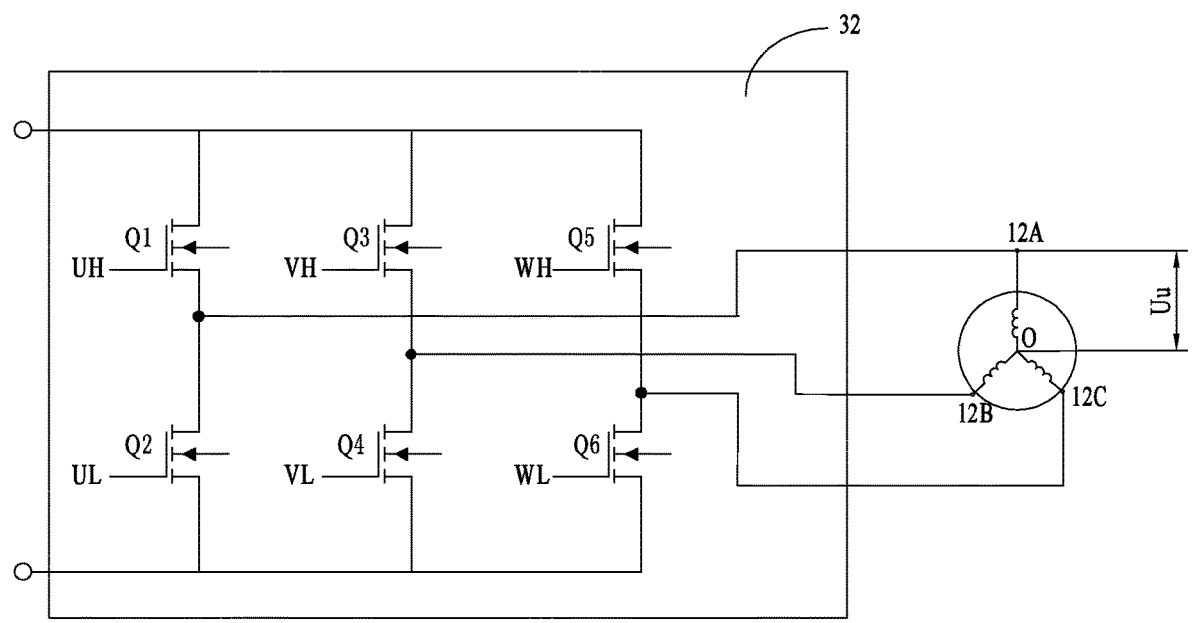
FIG. 3 is a circuit diagram of a drive circuit in FIG. 2.
Figure 4:
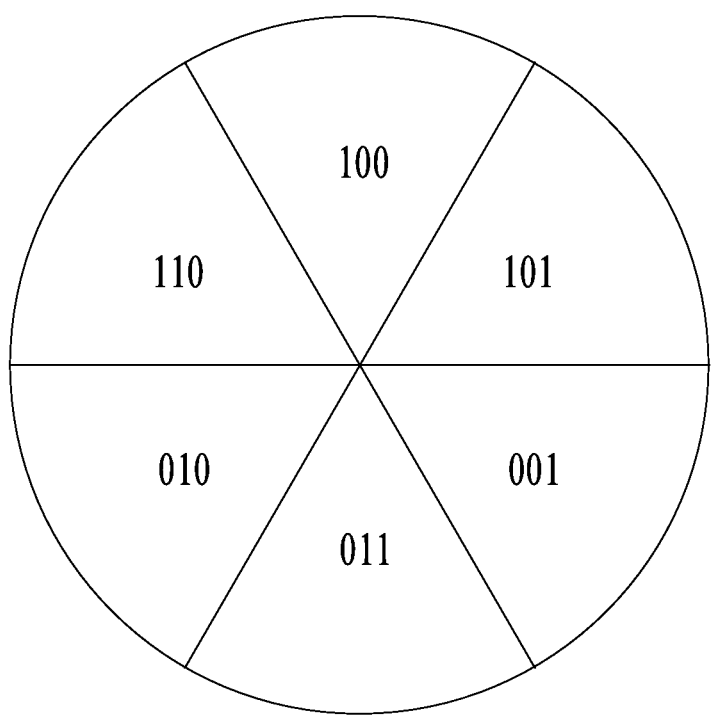
FIG. 4 is a schematic view showing a corresponding relation of a position sensor signal and a signal interval.

When the rotor rotates, the three Hall sensors 41 can generate a position signal including six signal combinations, so that the position detection module 34 outputs a position signal including one of the six signal combinations. As shown in FIG. 3, there are six different signal combinations 100, 110, 010, 011, 001, 101 which are arranged according to the order of the Hall sensors 41. So, the position detection module 34 can output one of the six position signals, and the position of the rotor can be learned according to the position detection signal output by the position detection module 34.

For a brushless motor with three-phase windings, it has six driving states in an electrical cycle which corresponds to the output signals mentioned above. Thus, when the output signal of the position detection module 34 changes, the brushless motor can perform a commutation.

The controller 33 has an input terminal which is connected electrically with an output terminal of the position detection module 34. The controller 33 is configured to output corresponding control signal to the drive circuit 32 according to the position signal input by the position detection module 34, so that the drive circuit 32 drives the motor to power on, commutate or regulate speed.

The drive circuit 32 is used to drive the motor 12. As shown in FIG. 3, the drive circuit 32 includes switch elements Q1, Q2, Q3, Q4, Q5, Q6. The gate terminals of the switch elements Q1-Q6 are connected with the output terminals UH, UL, VH, VL, WH, WL of the controller 33 respectively. The drain electrodes or the source electrodes of the switch elements are connected with the stator windings of the motor. The switch elements Q1-Q6 change on state according to the control signal output by the controller 33 so as to change the voltage state of the brushless motor windings loaded by the power module 23.

To make the brushless motor rotate, the drive circuit 32 has several driving states. In one driving state, the stator windings of the motor can produce a magnetic field. The controller 33 controls the drive circuit 32 to switch the driving state so as to make the magnetic field rotate to drive the rotor rotate. Thus, the drive of the brushless motor is realized.

Taking the brushless motor shown in FIG. 3 as an example, it has three-phase winding U, V, W in Y-type connection. Each one end of the three-phase windings is connected with a neutral point O, and the other ends 12A, 12B, 12C act as winding terminals to lead to the brushless motor and connect with the winding terminals disposed on the brushless motor. The drive circuit 32 and other peripheral circuits can be connected with the ends 12A, 12B, 12C of the three-phase windings U, V, W through the winding terminals.

In order to drive the brushless motor shown in FIG. 3, the drive circuit 32 has at least six driving states. For illustrating conveniently, the ends connected and corresponded to the driving states are used to indicate the driving states. For example, the drive circuit 32 makes the ends 12A, 12B connected with the power supply, if the end 12A is the high voltage end, then the driving state is AB, and if the end 12B is the high voltage end, then the driving state is BA. This driving method indicated is also adapted to the windings with a triangle connection. Otherwise, the switch of the driving states can be called the commutation of the brushless motor for short. Obviously, the rotor rotates every 30°, the brushless motor commutates once. The interval between two commutations of the brushless motor is defined as a commutation interval.

When the brushless motor works normally, the drive circuit 32 outputs six driving states AB, AC, BC, BA, CA, CB successively. The corresponding relation of the driving states and the output signals of the position detection module 34 is shown in Table 1.

TABLE 1

| Signal combination | Driving state |
| --- | --- |
| 101 | AB |
| 100 | AC |
| 110 | BC |
| 010 | BA |
| 011 | CA |
| 001 | CB |

According to the corresponding relation, when the controller 33 detects the signal change of the position detection module 34, it controls the drive circuit 32 to switch the driving state.

When the motor speed increases, the counter electromotive force increases therewith. When the motor speed is close to the maximum speed, the counter electromotive force may be higher than the maximum voltage supplied by the drive circuit 32, and the drive circuit 32 cannot supply sufficient power to the motor 12 to overcome the increasing counter electromotive force.

To overcome the increasing counter electromotive force due to the higher motor speed, or increase the torque of the motor 12 continuously when the motor 12 meets the maximum output power, the excitation of the rotor can be controlled by controlling the phase angle of the phase voltage. Compared with the advance phase current of the increasing counter electromotive force, the magnetic flux generated by the permanent magnet decreases, so that the counter electromotive force generated by the permanent magnet decreases and the torque reduces.

However, when the motor is overloaded, the current of the stator windings is large which may cause severe armature reaction and lead to the reduction of the phase advance angle, the phase advance angle even lags the magnetic field of the rotor, and the effect of weak magnetic acceleration cannot be reached.

When the motor is overloaded, the controller 33 outputs the control signal for making the suspended phase connect with the high voltage end or the low voltage end according to the access state of the two of the three phases which are connected with the high voltage end 23a and the low voltage end 23b of the power module 23.

In order to illustrate conveniently, the phase of the winding terminal of the three-phase windings which is suspended is defined as the suspended phase. For example, when the driving state of the drive circuit 32 is AB, the winding terminal 12a is connected with the high voltage end 23a of the power module 23, the winding terminal 12b is connected with the low voltage end 23b of the power module 23, and the winding terminal 12c is suspended. So, the winding terminal 12c is the suspended phase.

When the motor 12 works, the corresponding relation of the driving state of the drive circuit 32 and the access state of the suspended phase is shown in Table 2.

TABLE 2

| Signal combination | Driving state | Suspended phase | Access state of the suspended phase |
| --- | --- | --- | --- |
| 101 | AB | C | 23b |
| 100 | AC | B | 23a |
| 110 | BC | A | 23b |
| 010 | BA | C | 23a |
| 011 | CA | B | 23b |
| 001 | CB | A | 23a |

In the time when the rotor rotates once, that is in a cycle, the controller 33 outputs the corresponding control signals to the drive circuit 32 successively according to the mode shown in Table 2.

Specifically, when the drive circuit 32 is in the driving state AB, the controller 33 outputs the control signal to switch on the switch element Q6 and makes the suspended phase C connect with the low voltage end 23b. When the drive circuit 32 is in the driving state AC, the controller 33 outputs the control signal to switch on the switch element Q3 and makes the suspended phase B connect with the high voltage end 23a. When the drive circuit 32 is in the driving state BC, the controller 33 outputs the control signal to switch on the switch element Q2 and makes the suspended phase A connect with the low voltage end 23b. When the drive circuit 32 is in the driving state BA, the controller 33 outputs the control signal to switch on the switch element Q5 and makes the suspended phase C connect with the high voltage end 23a. When the drive circuit 32 is in the driving state CA, the controller 33 outputs the control signal to switch on the switch element Q4 and makes the suspended phase B connect with the low voltage end 23b. When the drive circuit 32 is in the driving state CB, the controller 33 outputs the control signal to switch on the switch element Q1 and makes the suspended phase A connect with the high voltage end 23a. In this manner, the motor commutates once every 30° in a cycle of the rotor, and each switch element switches on 180°. The on-time is increased, and the weak magnetic effect is increased, so that the motor efficiency is improved.

Obviously, the motor performs the commutation once when the rotor rotates every 30°. The suspended phase is connected with the high voltage end or the low voltage end, and the voltage of the suspended phase is adjusted by SWMP so that the suspended phase can output sine-like signal matching with the counter electromotive force of the motor to improve the output stability of the motor. It is noted that the sine-like signal here includes the sine signal and the sine-like signal with a constant slope.

In order to describe conveniently, the time when the rotor rotates 30° is defined as a commutation interval of the motor. In a commutation interval, the controller is configured to make the suspended phase connect with one of the high voltage end and the low voltage end, and the suspended phase connects with the other of the high voltage end and the low voltage end until a preset range is reached. The preset range means a range of the potential difference between the suspended phase and the neutral point which is close to 0 or equal to 0, that is a range of the counter electromotive force of the motor which is close to 0 or equal to 0. In a commutation interval, the controller outputs the control signal adjusted by SPWM to the suspended phase.

Specifically, when the drive circuit 32 is in the driving state AB, the controller outputs the control signal to switch on the switch element Q6 and the control signal adjusted by SPWM so as to make the suspended phase C connect with the low voltage end 23b, and loads the sine wave on the suspended phase C in the SPWM method. At this moment, the voltage of the suspended phase, that is the voltage UW between the suspended phase C and the neutral point O, changes in the form of sine wave. When the suspended voltage UW is close to 0, the controller outputs the control signal to switch on the switch element Q5 so as to make the suspended phase C connect with the high voltage end 23b, and loads on the suspended phase C in the SPWM method to make the suspended voltage UW changes in the form of a sine wave. Thus, in a commutation interval, the suspended phase C outputs the sine-like wave matching with the counter electromotive force so that the output stability of the motor is improved effectively. In the other five commutation intervals of a cycle, the controller outputs corresponding control signal according to the method mentioned above to make the suspended phase connect with the high voltage end or the low voltage end, and loads the sine wave on the corresponding suspended phase in the SPWM method.

Figure 5:
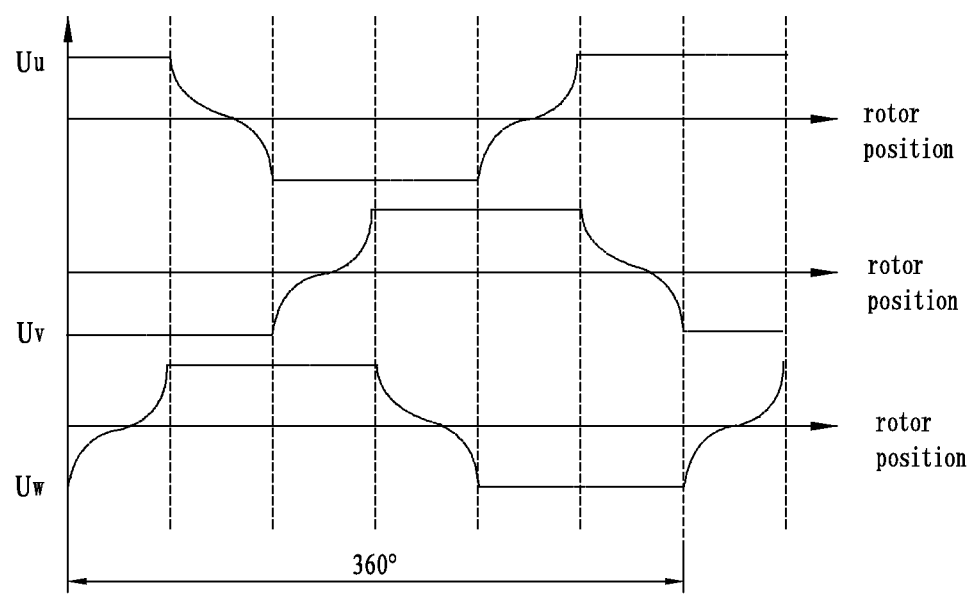
FIG. 5 is a graph view showing a corresponding relation curve of each phase voltage and rotor position of a brushless motor in an example.

As shown in FIG. 5, in another example, a corresponding relation curve of each phase voltage and the rotor position of a brushless motor in a cycle or the time when the rotor rotates 360° is shown. The horizontal axis means the rotor position, and the vertical axis means the phase voltage. In this curve, the controller outputs the modulated signal with the sine-like waveform which has changing slopes to change the voltage loaded on the suspended phase.

Figure 6:
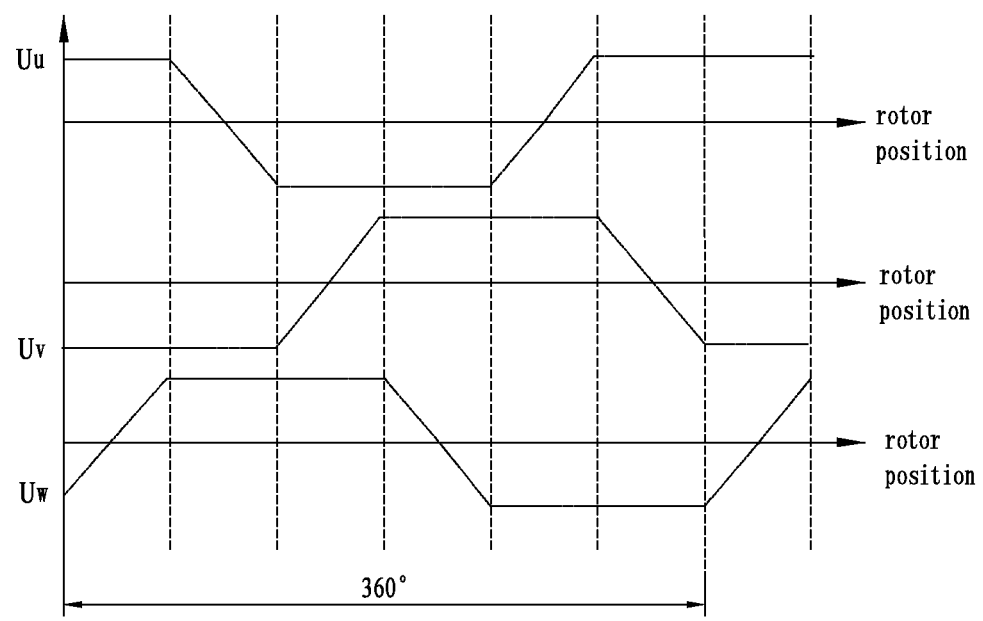
FIG. 6 is a graph showing a corresponding relation curve of each phase voltage and rotor position of a brushless motor in another example.

As shown in FIG. 6, in another example, a corresponding relation curve of each phase voltage and the rotor position of a brushless motor in a cycle or the time when the rotor rotates 360° is shown. In this curve, the controller outputs the SPWM modulated signal with constant slope to change the voltage loaded on the suspended phase.

The controller 33 further includes a timing unit for recording the time and a storage unit for processing and storing data. The timing unit records the time of a commutation interval. The storage unit stores the time data recorded by the timing unit and the angle data of the rotor, and establishes a corresponding relation table of the time data and the angle data. Supposing that the rotor rotates an angle θ in a time t, an intermediate point of the rotor position in the next commutation interval can be calculated according to the information of the rotation angle of the rotor and the corresponding time stored in the storage unit. As an example, in this commutation interval, when the two phases are connected with the high voltage end and the low voltage end respectively, the controller 33 makes the suspended phase connect with the high voltage end to the intermediate point firstly, and then makes the suspended phase connect with low voltage end. That is, the intermediate point of this commutation interval is acted as a switching point of the suspended phase switching from the high voltage end to the low voltage end.

In another example, in a commutation interval, when the two phases are connected with the high voltage end and the low voltage end respectively, the controller 33 firstly makes the suspended phase connect with the low voltage end until the voltage of the suspended phase is close to 0 or reaches a preset range, and then makes the suspended phase connect with high voltage end.

When the controller 33 outputs the SPWM modulated signal to adjust the voltage of the suspended phase, it can adjust the voltage of the suspended phase according to the bus current or the phase current. When the bus current is small, the controller 33 outputs the sine signal with small amplitude through SPWM. And when the bus current is large, the controller 33 outputs the sine signal with large amplitude through SPWM. Specifically, when the detection module detects that the bus current is greater than a preset value and less than a first current value, the controller 33 outputs a first modulated signal to the suspended phase, and when the bus current is greater than the first current value and less than a second current value, the controller 33 outputs a second modulated signal to the suspended phase. The first current value is less than the second current value. The duty cycle of the first modulated signal is less than the duty cycle of the second modulated signal. Both the first modulated signal and the second modulated signal are output through SPWM.

As shown in FIG. 9, the drive circuit 32 further includes capacitors C1, C2, C3, C4, C5, C6 which are connected in parallel with each switch elements respectively. The non-mutated properties of the voltages at both ends of the capacitor make it possible for the drive circuit 32 to protect the switching elements from being destroyed when the power is suddenly cut off or when there is a large current shock. Specifically, the switching elements are MOSFETs or IGBTs.

The power tool further includes a voltage sampling module 36. As an example, the input terminal of the voltage sampling module 36 is connected with the output terminal of the rectifier module 22 for detecting the DC voltage output by the rectifier module 22. As another example, the input terminal of the voltage sampling module 36 is connected with the output terminal of the AC power module 20 for detecting the AC voltage output by the AC power module 20. Whether it is the alternating current output by the AC power module 20 or the direct current output through the rectifier module 22, there is fluctuation in the voltage signal. Loading the current directly may result in the instability of the motor speed. The controller 33 responds to the voltage signal input by the voltage sampling module 36 and is configured to perform the operation: when the voltage rises, the controller 33 outputs the control signal for reducing the voltage to the drive circuit 32.

Figure 7:
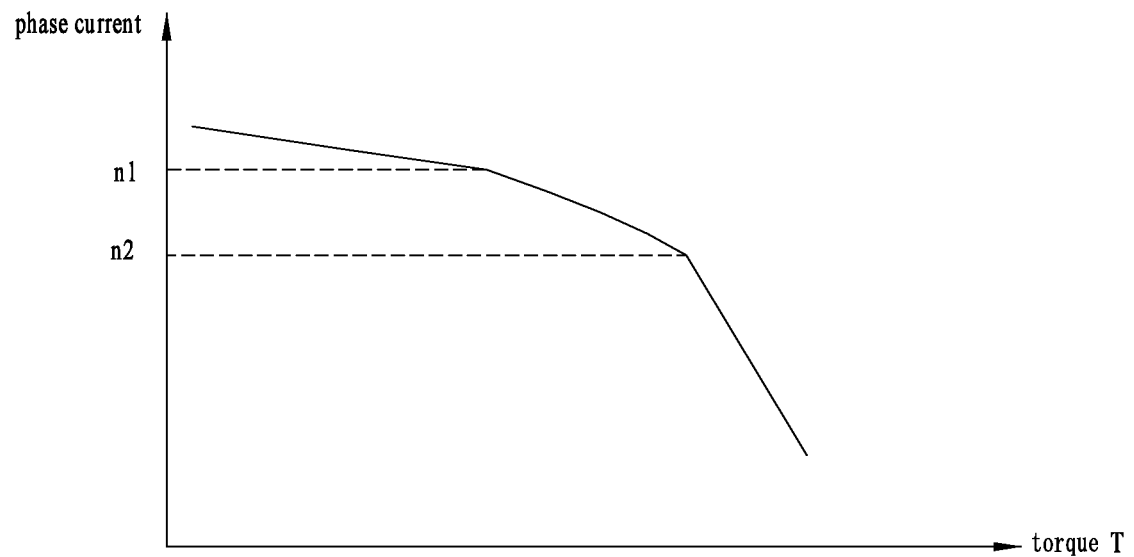
FIG. 7 is a graph showing the speed changing with the torque.

Specifically, when the voltage sampling module 36 detects that the voltage signal output by the AC power module 20 or the rectifier module 22 rises, the controller 33 outputs the control signal for reducing the duty cycle to the drive circuit 32, and when the voltage signal reduces, the controller 33 outputs the control signal for increasing the duty cycle to the drive circuit 32. Further, the controller 33 outputs the control signal with a corresponding duty cycle to the drive circuit 32 according to the rising variation or the reducing variation of the voltage signal. For example, when the rising variation is large, the controller 33 outputs the control signal with a large duty cycle to the drive circuit 32, and when the rising variation is small, the controller 33 outputs the control signal with a small duty cycle to the drive circuit 32. The controller 33 can compare the variation and the variation trend of the voltage real-time output, and real-time output the control signal with the duty cycle changing with the voltage variation trend to the drive circuit 32. So, the drive circuit 32 has a stable output voltage, and the three-phase windings of the motor has a stable voltage input. It ensures that the motor has stable rotation speed, and the vibration noise of the rotation is reduced. As shown in FIG. 7, the controller 33 reduces the ripple fluctuation of the voltage loaded on the drive circuit 32 effectively by using the control method aforementioned.

It is noted that, the control method aforementioned, which is the controller outputs the corresponding control signal for adjusting the duty cycle to the drive circuit according to the voltage variation input by the rectifier module, is adapted to a low power sander. In this control method, the controller reduces the duty cycle when the voltage signal rises, which is equal to limit the motor to input current when it has the high voltage.

In another example, to improve the overall efficiency of the motor and make the motor adapt to the power tool with large power such as the angle grinder, the voltage sampling module 36 detects the output voltage of the rectifier module. When the output voltage rises to a first preset voltage and/or the voltage rising variation reaches a preset variation, the controller 33 outputs a first control signal to switch on two of the six switching elements of the drive circuit 32. The first preset voltage is less than the voltage when the rotor rotates 60°. This is equivalent to switch on the switching elements of the drive circuit 32 in advance, that is increasing the advance angle. The input current of the motor with the low voltage is increased while keeping the voltage of the rectifier module stable, so that the overall efficiency of the motor is improved.

As an example, when the voltage output by the rectifier module rises to the first preset voltage and/or the voltage variation reaches to the preset variation, the controller 33 outputs the first control signal to switch on two of the six switching elements of the drive circuit 32 with a certain duty cycle. As another example, the controller 33 outputs the first control signal to switch on two of the six switching elements of the drive circuit 32 with a changing duty cycle so as to enhance the overload capacity of the motor.

Obviously, when the voltage of the rectifier module detected by the voltage sampling module 36 reduces to the second preset voltage or the voltage variation reaches the preset variation, the controller 33 outputs the second control signal to switch off two of the six switching elements of the drive circuit 32. This is equal to switch off the switching elements of the drive circuit 32 in advance. The input current of the motor with high voltage is improved while improving the current smoothness, so that the overall efficiency of the motor is improved.

As previously mentioned, the drive circuit 32 includes six switching elements, and the drive circuit 32 switches on or off the switching elements to make the motor commutate according to the control signal output by the controller 33. As an example, when the voltage output by the voltage sampling module 36 rises, in a commutation interval, the controller delays to output the control signal for making the motor enter the commutation interval and outputs the control signal for making the motor finish the commutation interval in advance. When the voltage output by the voltage sampling module 36 reduces, in a commutation interval, the controller outputs the control signal for making the motor enter the commutation interval in advance and delays to output the control signal for making the motor finish the commutation interval. In this manner, when the voltage detected rises, the on-time of the switch elements is decreased, and when the voltage detected reduces, the on-time of the switch elements is increased, so the output voltage of the drive circuit 32 is stable. Obviously, when the voltage output by the voltage sampling module 36 rises, the controller can also output the control signal to make the motor delay to enter the commutation interval and reduce the duty cycle. It is noted that the voltage sampling module 36 may be a separate module in the system or integrated with the controller 33.

The angle grinder 100 further includes a detector 35 connected with the motor windings 31 electrically. The detector 35 includes a current detection unit for detecting the output current of the drive circuit 32, that is the bus current. When the current detected by the current detection unit is greater than a preset current value, the controller 33 outputs the control signal for reducing the duty cycle to the drive circuit 32 so as to reduce the current loaded on the motor winding.

Figure 8:
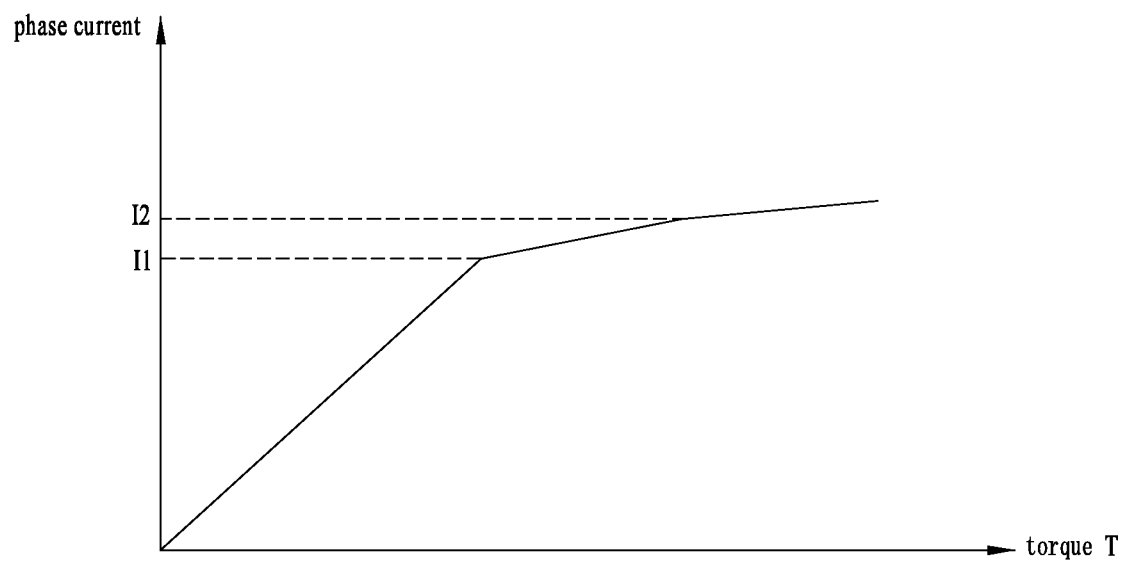
FIG. 8 is a graph showing the phase current changing with the torque.

As shown in FIG. 8, when the current of the brushless motor 12 reaches a first current value I1, the controller 33 outputs a driving signal with a first duty cycle, and when the current of the brushless motor 12 reaches a second current value I2, the controller 33 outputs a driving signal with a second duty cycle. The first current value I1 is less than the second current value I2, and the first duty cycle is greater than the second duty cycle.

As an example, when the motor current reaches a first current value, the controller 33 outputs the driving signal with a duty cycle reduced in a first slope, and when the motor current reaches a second current value, the controller 33 outputs the driving signal with a duty cycle reduced in a second slope. The first current value is greater than the second current value, and the absolute value of the first slope is less than the absolute value of the second slope.

The detector 35 further includes a rotation speed detection unit for detecting the rotation speed of the motor. When the rotation speed of the motor detected by the rotation speed detection unit exceeds a preset speed value, the controller 33 outputs the control signal for reducing the duty cycle to the drive circuit 32. Specifically, when the rotation speed of the brushless motor reaches a first rotation speed, the controller 33 outputs the driving signal with a first duty cycle, and when the rotation speed of the brushless motor reaches a second rotation speed, the controller 33 outputs the driving signal with a second duty cycle. The first rotation speed is greater than the second rotation speed, and the first duty cycle is greater than the second duty cycle.

The detector 35 further includes a voltage detection unit for detecting the motor voltage. When the motor voltage detected by the voltage detection unit exceeds a preset voltage value, the controller 33 outputs the control signal for reducing the duty cycle to the drive circuit 32. Specifically, when the phase voltage of the brushless motor reaches a first preset voltage value, the controller 33 outputs the driving signal with a first duty cycle, and when the phase voltage of the brushless motor reaches a second preset voltage value, the controller 33 outputs the driving signal with a second duty cycle. The first preset voltage value is less than the second preset voltage value, and the first duty cycle is greater than the second duty cycle.

The detector 35 further includes a temperature detection unit for detecting the temperature of the drive circuit 32. When the temperature reaches a preset value, the current of the drive circuit 32 is reduced to maintain the temperature on the preset value. Specifically, the controller outputs the driving signal for reducing the duty cycle to maintain the temperature on the preset value.

The power tool is not limited to the angle grinder. The power tool such as a circular saw, a jig saw, a reciprocating saw, a miter saw, a tile cutter, a lawn mower and so on which can be connected with AC power and DC power can adopt the examples mentioned above.

The above illustrates and describes basic principles, main features and advantages of the present invention. Those skilled in the art should appreciate that the above examples do not limit the present invention in any form. Technical solutions obtained by equivalent substitution or equivalent variations all fall within the scope of the present invention.

What is claimed is:
1. A power tool, comprising:
an AC power module for connecting to a source of AC power;
a brushless motor coupled to an output shaft for applying a rotational force, the brushless motor comprising a motor and a stator;
a rectifier module for receiving an alternating current from the AC power module and converting the alternating current into a direct current;
a drive circuit connected to the brushless motor for driving the brushless motor;
a controller connecting to the drive circuit for outputting a control signal to the drive circuit to cause the drive circuit to drive the brushless motor;
a capacitor connected between the rectifier module and the driving circuit;
an EMI module electrically connected between the AC power module and the rectifier module; and
a circuit board comprising the capacitor, the rectifier module, and the EMI module arranged on the circuit board,
wherein the EMI module is electrically connected with the AC power module to filter interference signals in an AC current wherein the stator includes a stator metal region housing and windings, the EMI module includes a first EMI capacitor, a second EMI capacitor and a third EMI capacitor, one end of the first EMI capacitor is connected to a high voltage end of the AC power module, another end of the first EMI capacitor is connected to one end of the second EMI capacitor, the another end of the second EMI capacitor is connected with a low-voltage terminal of the AC power module, one end of the third EMI capacitor is connected with a connection of the first EMI capacitor and the second EMI capacitor, another end of the third EMI capacitor is grounded, and the stator metal region housing is directly connected to a node between the first EMI capacitor and the second EMI capacitor, and wherein a ratio of a capacitance value of the capacitor to a rated power of the brushless motor ranges from 20 uF/kw to 80 uF/kw.

2. The power tool of claim 1, wherein the drive circuit comprises a plurality of switch elements and the controller outputs a control signal to selectively turn on or off the switching elements to cause the drive circuit to drive the brushless motor.

3. The power tool of claim 1, further comprising a circuit board and the capacitor and the rectifier module are arranged on the circuit board.

4. The power tool of claim 3, wherein a ratio of a projected area of the capacitor on a maximum plane of the circuit board to a total area of the maximum plane of the circuit board is in a range of 1/50~1/15.

5. The power tool of claim 1, wherein the brushless motor is a three-phase, brushless DC motor.

6. The power tool of claim 1, wherein an AC voltage accessed by the AC power module is at least 85 v.

7. The power tool of claim 1, wherein an AC voltage accessed by the AC power module is in a range of 210 v~230 v.

8. The power tool of claim 1, wherein the EMI module is connected between the AC power module and the rectifier module.

9. The power tool of claim 1, wherein the capacitor is an electrolytic capacitor or a tantalum capacitor.

10. The power tool of claim 1, wherein a ratio of a difference between a maximum voltage of an alternating current connected to the AC module and a rated voltage of the brushless motor to an AC voltage maximum value is in a range of −25%~+25%.

11. The power tool of claim 1, wherein a ratio of a difference between a maximum voltage of an alternating current connected to the AC module and a rated voltage of the brushless motor to an AC voltage maximum value is in a range of −15%~+15%.

12. The power tool of claim 1, wherein the drive circuit comprise an electronic switch and the controller uses a PWM signal to control the electronic switch and changes the duty cycle of the PWM signal according to a ripple of a rectified ripple voltage of the rectifier module.

13. The power tool of claim 1, further comprising a voltage sampling module configured to detect a rectified pulsating voltage of the rectifier module.

14. The power tool of claim 13, wherein the controller outputs a duty cycle reducing control signal to the driving circuit when an output voltage value of the voltage sampling module increases and reaches a first preset voltage value.

15. The power tool of claim 13, wherein the controller outputs a control signal for decreasing the duty cycle to the driving circuit when a change amount of an output voltage rise of the voltage sampling module reaches a preset change amount.

16. The power tool of claim 13, wherein the controller outputs a control signal for increasing the duty cycle to the drive circuit when an output voltage value of the voltage sampling module is lowered to a second preset voltage.

17. The power tool of claim 13, wherein the controller outputs a control signal to the driving circuit for increasing the duty cycle when an output voltage value of the voltage sampling module is reduced to a second preset voltage.

18. The power tool of claim 13, wherein the controller outputs a control signal for increasing the duty cycle to the driving circuit when an output voltage value of the voltage sampling module is reduced by a preset change amount.

19. The power tool of claim 1, wherein the stator metal region housing is directly connected to a node between the first capacitor and the second capacitor by a wire.

20. The power tool of claim 1, wherein a ratio of a projected area of the capacitor on a maximum plane of the circuit board to a total area of the maximum plane of the circuit board is in the range of 1/50 to 1/15.

* * * * *